June 30, 1931. A. B. LEET 1,812,656
FEED MECHANISM FOR MACHINE TOOLS
Filed Nov. 3, 1926 3 Sheets-Sheet 1

Inventor:
Albert B. Leet
By Wilson & McKenna
Attys.

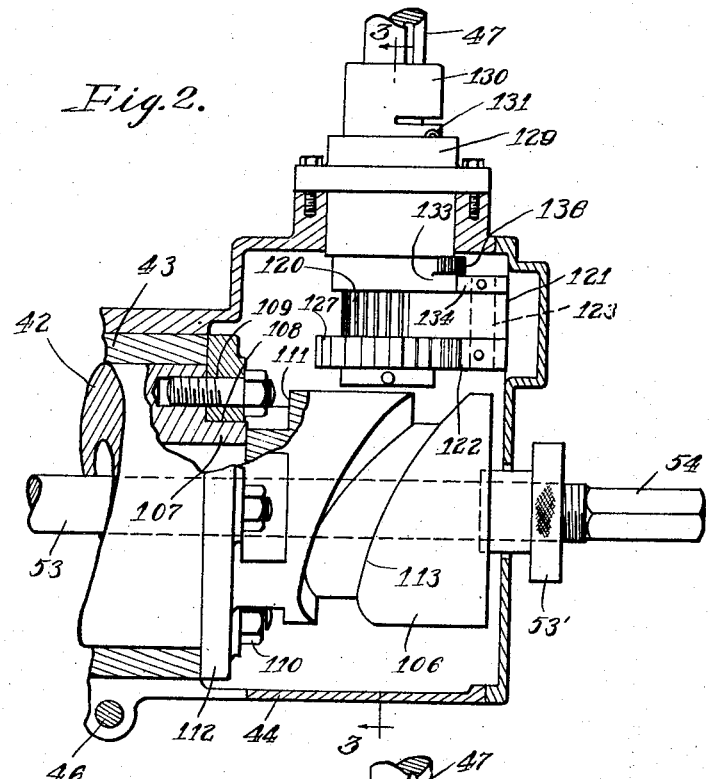
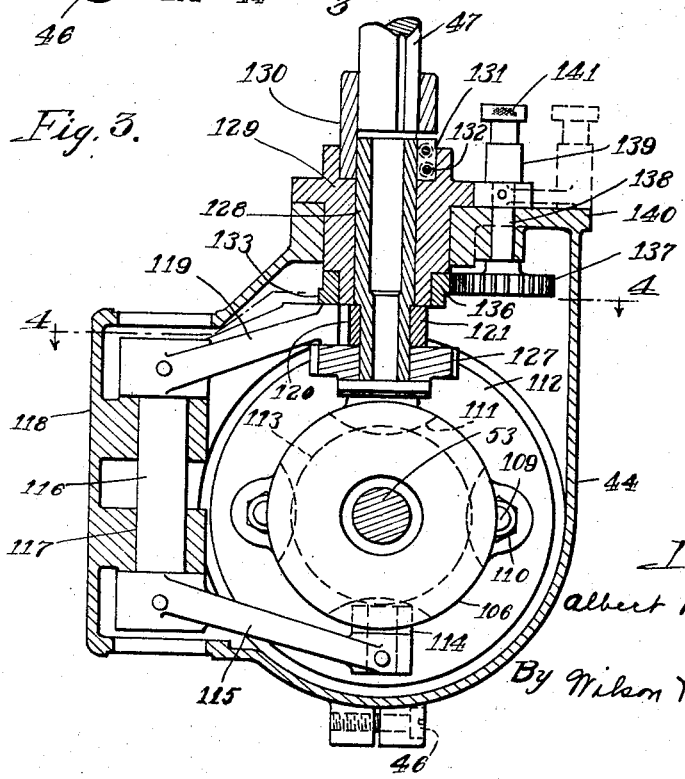

June 30, 1931.  A. B. LEET  1,812,656
FEED MECHANISM FOR MACHINE TOOLS
Filed Nov. 3, 1926  3 Sheets-Sheet 3

Inventor
Albert B. Leet
By Wilson & McCanna
Attys.

Patented June 30, 1931

1,812,656

UNITED STATES PATENT OFFICE

ALBERT B. LEET, OF ROCKFORD, ILLINOIS, ASSIGNOR TO ROCKFORD MACHINE TOOL CO., OF ROCKFORD, ILLINOIS, A CORPORATION OF ILLINOIS

FEED MECHANISM FOR MACHINE TOOLS

Application filed November 3, 1926. Serial No. 145,942.

This invention relates to machine tools generally, and has more particular reference to an improved feed mechanism.

The principal object of my invention is to provide an extremely simple, compact, and economical feed mechanism which, while especially designed and adapted for use on a planer and shaper, is not limited to such use.

A special feature of the feed mechanism of my invention is the novel means for varying the rate of feed to suit the requirements of any particular job being handled.

Another feature is the provision of a quickly detachable connection between the feed shaft and the feed mechanism to permit the easy mounting of special attachments on the column and connection thereof with the feed shaft, to make the machine available for a much broader range of shop uses.

Referring to the accompanying drawings—

Fig. 2 is a vertical section through the feed transmission gearing housing on the bed taken on the line 2—2 of Fig. 1 looking in the direction of the arrows, the section being on an enlarged scale;

Fig. 3 is a vertical section taken on the line 3—3 of Fig. 2 looking in the direction of the arrows;

Throughout the views similar reference numerals are applied to corresponding parts.

The machine in connection with which the present invention is illustrated, as stated above, is a universal one for heavy duty purposes intended for use in factories and repair shops for production work, planing jobs, and close to shoulder work; also for use in tool rooms for jig work, die work, or any planing or shaping requiring speed and accuracy; and also in railroad and marine engine shops for machining wedges, shoes, brasses, valve gears, etc.

Figure 1:
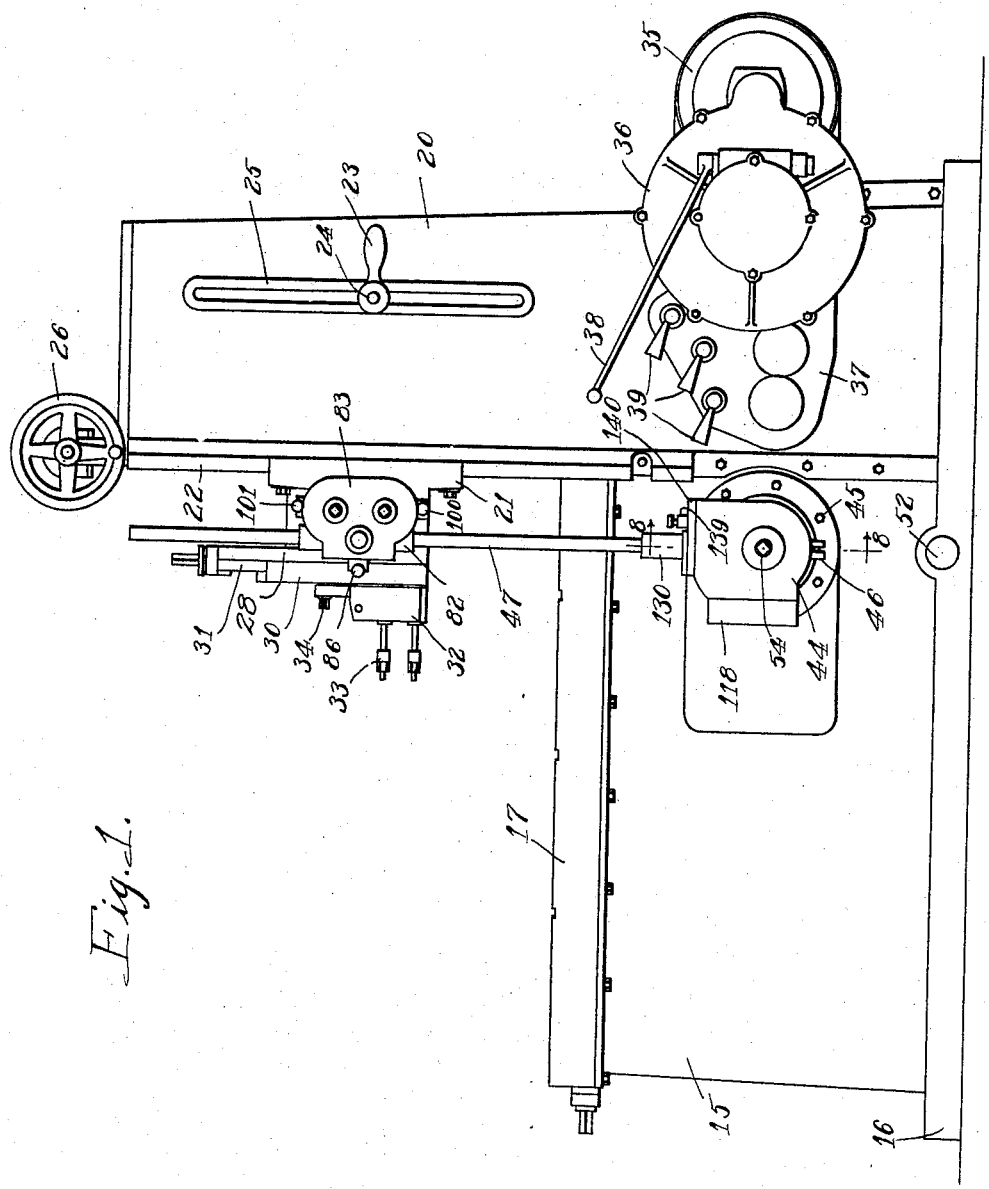
Figure 1 is a front view of a machine embodying my invention.

Referring first to Fig. 1, the reference numeral 15 designates the bed of the machine which is troughed at its base, as indicated at 16, so as to catch any oil dripping from the bearings. The base also provides the usual bosses for bolting the machine to its foundation. A table 17 is reciprocable lengthwise of the bed suitably in V-shaped bed rails and has T-slots for fastening the work thereon, which preferably extend the full length of the working surface. At the operator's side of the machine a column 20 rises from the side of the bed and has a cross rail 21 bearing on ways 22 on the side of the column with a bracket portion bearing on the back of the column and arranged to be clamped by the hand nut 23. This nut engages a bolt 24 extending through the column from the bracket portion aforesaid and movable in the slot 25 in the side of the column. The cross rail is arranged to be raised and lowered by a hand wheel 26 which serves to turn a vertical screw engaging in a nut provided on the cross rail. A saddle 28 operates horizontally across the table 17 on ways provided on the cross rail and has a tool head 30 mounted thereon for vertical movement on ways 31. The tool holding part 32, with its tool clamping plates 33, is arranged for swivel adjustment in a well known manner and to be clamped in adjusted position by the bolts 34. The means for horizontally and vertically feeding the tool head on the cross rail will be described in detail hereinafter so that it will suffice to refer generally at this point to the gearing and other transmission through which said means, as well as the means for communicating reciprocatory movement to the table, derive their power. An electric motor 35 is mounted on a finished surface on the side of the column 20 and has connection through a friction clutch within the housing 36 with a set of change-speed gears at 37 disposed within the column 20. The clutch, just referred to, is controlled by a hand lever 38 within convenient reach of the operator standing alongside the column of the machine. The gear shift levers 39 are also within his convenient reach. The terminal gear of the intermediate transmission just described meshes with a bull gear arranged to transmit a slow forward and a quick return movement to the table through the intermediary of a Whitworth mechanism. The enlarged hub 42 of said bull gear (see Fig. 2) is received in a bearing 43 provided in the side wall of the bed 15, and over which the housing 44, hereinafter referred to as the power feed transmission gearing housing, is mounted and suitably bolted, as shown at 45, and clamped as shown at 46. A vertical power feed shaft 47 extends into the housing 44 and is arranged to serve in the horizontal and vertical feeding of the tool head. From the description thus far, the general character of the machine will no doubt be apparent.

The shaft 47, referred to as the vertical power feed shaft, extends upwardly from the housing 44 through bearings 82 in a housing 83 on the end of the cross rail 21. The shaft 47 is suitably splined its full length for driving connection with mechanism in the housing 83 in any position of the cross rail on the column and so that it can also have connection with mechanism in the housing of an attachment mounted on the column beneath the cross rail, if desired. Without going into details regarding the mechanism in the housing 83, inasmuch as the present invention is not particularly concerned therewith, it will suffice to state that shifting of the handle 86 selects the direction of travel for either horizontal or vertical feeding of the tool head or saddle, and that horizontal feed is selected by shifting the handle 100 and vertical feed by shifting the handle 101. In the case of certain attachments, a single shaft may be clutched with the feed shaft 47 to give angular attachment to a tool head.

Figure 4:
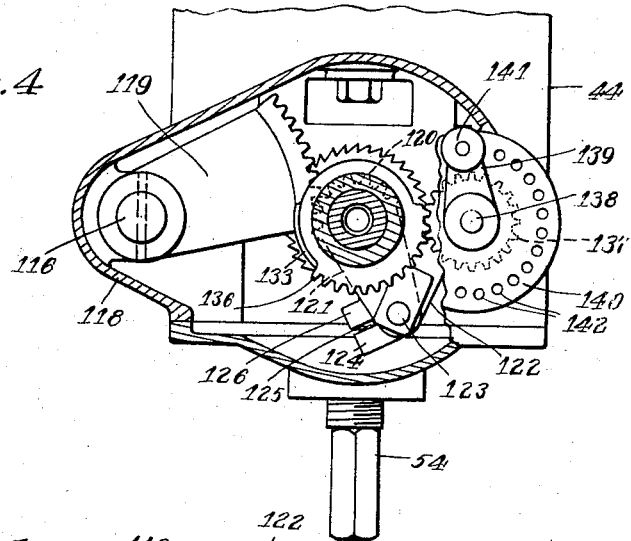
Fig. 4 is a horizontal section taken on the broken line 4—4 of Fig. 3 looking in the direction of the arrows.
Figure 5:
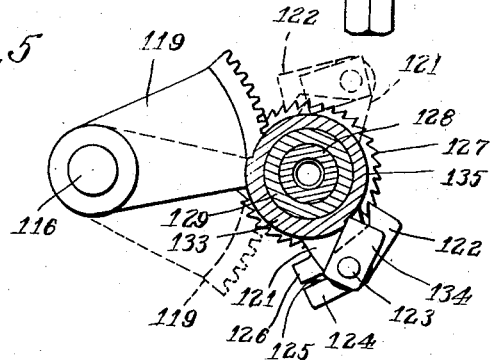
Fig. 5 is an isolated detail showing the operation of the power feed parts appearing in Figs. 2 to 4.

Referring now more particularly to Figs. 2 to 4, it will be seen that the hub 42 of the bull gear has a cylindrical grooved cam 106 fixed to the outer end thereof where the hub has a reduced portion 107 projecting from the end of the bearing 43. The cam 106, as shown, has a depression at 108 in the end thereof whereby to fit over the reduced portion 107 of the hub 42 and is arranged to be secured to the hub 42 by a plurality of studs 109 threading in the end of the hub 42 and receiving nuts 110 in recesses 111 provided in the periphery of the cam 106 adjacent the enlarged end 112 thereof. The latter provides a shoulder for engagement with the end of the bearing 43 to retain the parts against relative endwise movement. The peripheral cam groove 113 in the cam 106 receives a roller 114 mounted on a pin on the end of a lever or rocker arm 115 fixed to the lower end of a vertical stub shaft 116 received in bearings 117 in an offset portion 118 of the housing 44. The upper end of the shaft 116 has a gear sector 119 fixed thereto. The latter is arranged to be oscillated back and forth horizontally in each complete rotation of the cam 106 and hence in a complete rotation of the bull gear. The sector 119 meshes with a segmental gear 120 provided on the bearing hub of a lever 121. The latter carries a pawl 122 pivoted by means of a pin 123 to the outer end thereof. A tail portion 124 on the pawl 122 has a compression spring 125 acting between the same and a lug 126 provided on the lever 121 to urge the pawl 122 normally inwardly into engagement with the teeth of a ratchet wheel 127. The ratchet 127 is fixed to the lower end of a hollow shaft 128 received in a bearing sleeve 129 fixed in an opening in the upper wall of the housing 44. The description thus far will suffice to show that in the continuous rotation of the bull gear the sector gear 119 is oscillated back and forth, as appears in dotted lines in Fig. 5, once for each complete rotation of the bull gear. The gear 119 communicates oscillation to the lever 121 so that the shaft 128 is intermittently rotated in one direction by the pawl 122, the movement of the latter being indicated in dotted lines in Fig. 5. The shaft 128 has a friction drive coupling 130 secured thereto by means of a split clamping portion 131 wherein screws 132 are provided, the tightening of which determines the load which the coupling will transmit. The upper portion of the coupling 130 receives the end of the vertical power feed shaft 47 discussed at length above. In other words, the intermittent turning of the shaft 128 is transmitted to the shaft connected to the horizontal and vertical feed means on the cross rail.

Figure 6:
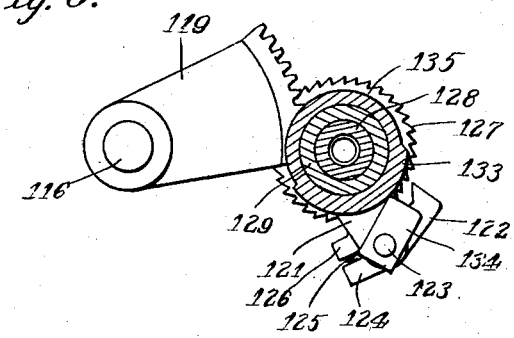
Fig. 6 is a similar view to illustrate the method of varying the rate of feed.

Provision is made for varying the rate of feed to suit the requirements of any particular job. In the present case the rate of feed is determined by varying the effective portion of the stroke of the pawl 122. In other words, the pawl has a travel as indicated by the full line and dotted line positions appearing in Fig. 5. The present means serves to keep the pawl disengaged for a portion of the stroke depending on the particular rate of feed desired, the pawl having a shorter effective stroke for slower feeding than for a faster rate of feeding. This method of control will appear in the course of the following description by comparison of Figs. 5 and 6. A cam 133 is provided mounted on a reduced lower extension of the bearing sleeve 129. A follower 134 rides on the ridge of the cam 133 and is arranged to hold the pawl 122 disengaged from the ratchet 127, as appears in Fig. 6. However, when the follower 134 rides off the ridge onto a depressed dwell portion 135, as appears in Fig. 5, the pawl 122 comes into engagement with the ratchet 127. The cam 133 may be rotatably adjusted to determine the point where the follower 134 rides off the ridge onto the depressed dwell portion of the periphery of the cam. The cam has a toothed sector 136 integral therewith meshing with an indexing gear 137. The latter is fixed on a stem 138 arranged to be rotated by a small crank 139 sweeping over an index plate 140 provided by a flat portion on the top of the housing 44. A spring pressed latch 141 provides a knob for turning the crank 139 and has an end arranged to be engaged selectively onto any one of a plurality of circularly arranged holes 142 provided in the index plate 140. Obviously, as the crank 139 is moved in a clockwise direction as viewed in Fig. 4 the cam 133 is turned in a counter clockwise direction as viewed in Figs. 5 and 6. Thus, the farther the crank 139 is turned the smaller will be the effective portion of the stroke of the pawl 122 and hence the slower the rate of feed. Suitable indicia may be provided in connection with the holes 142 in the index plate 140 to apprise the operator of the rate of feed which he selects.

In the mounting of a special attachment on the column 20 beneath the main cross rail 21, the shaft 47 may be raised out of the coupling 130 and after the attachment has been mounted on the column the shaft can then be inserted through bearings and a splined clutch collar on the attachment and back into connection with the coupling 130.

It is believed that the foregoing description conveys a sufficiently clear understanding of the invention and of its purposes and advantages so that any one skilled in the art to which the invention relates will appreciate all of the possible applications thereof.

I claim:

1. A feed mechanism for a machine tool comprising the combination with a continuously rotated element, and a feed shaft disposed in crosswise relation therewith and arranged to be intermittently rotated in one direction, of a housing, a cylindrical peripherally conformed cam in said housing turning with the aforesaid element, a rocker arm having operative connection with said cam to be positively oscillated back and forth in the continuous rotation thereof, a gear sector arranged to oscillate with said rocker arm, a gear element meshing with said sector and having a lever extending therefrom, a pawl mounted on said lever, a ratchet arranged to turn the feed shaft and having said pawl arranged for operating the same, a normally stationary but rotatably adjustable cam for holding the pawl disengaged from the ratchet through a portion of its stroke, a hand crank outside the housing for turning said cam, and means for locking said crank in various positions of adjustment.

2. A feed mechanism for a machine tool comprising the combination with a continuously rotated element, and a feed shaft disposed in crosswise relation therewith and arranged to be intermittently rotated in one direction, of a housing into which said element and shaft extend for operative connection with one another, a cylindrical peripherally grooved cam turning with said element in said housing, a stub shaft disposed in parallel relation with the feed shaft in said housing, a rocker arm fixed on said stub shaft and having operative connection at its free end with said cam whereby to be positively oscillated back and forth in the continuous turning of the cam, a gear sector also fixed on said stub shaft to oscillate with the rocker arm, a gear element mounted to turn with respect to the feed shaft and having meshing engagement with said sector, a pawl operated by the gear element, a ratchet wheel arranged to turn the feed shaft and operated by the pawl, a normally stationary but rotatably adjustable cam for holding the pawl disengaged from the ratchet through a portion of its stroke, a gear for angularly adjusting said cam, a gear meshing with the last mentioned gear within the housing, a hand crank outside the housing having connection with the last mentioned gear for turning the same, and means on the outside of said housing whereby the hand crank may be locked rigidly in various positions of angular adjustment.

In witness of the foregoing I affix my signature.

ALBERT B. LEET.